United States Patent
Kawasaki et al.

(10) Patent No.: US 7,886,561 B2
(45) Date of Patent: Feb. 15, 2011

(54) METHOD FOR DRAWING GLASS PARENT MATERIAL AND DRAWING MACHINE FOR USE THEREIN

(75) Inventors: Kiichiro Kawasaki, Kanagawa (JP); Sumio Hoshino, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 756 days.

(21) Appl. No.: 10/516,115

(22) PCT Filed: Jun. 17, 2003

(86) PCT No.: PCT/JP03/07681
§ 371 (c)(1),
(2), (4) Date: Nov. 30, 2004

(87) PCT Pub. No.: WO04/000740
PCT Pub. Date: Dec. 31, 2003

(65) Prior Publication Data
US 2005/0172672 A1 Aug. 11, 2005

(30) Foreign Application Priority Data
Jun. 19, 2002 (JP) .......................... P.2002-178372

(51) Int. Cl.
*C03B 37/012* (2006.01)
(52) U.S. Cl. .......................................... 65/381; 65/382
(58) Field of Classification Search ................... 65/381, 65/384, 382
See application file for complete search history.

(56) References Cited

U.S. PATENT DOCUMENTS

| | | | |
|---|---|---|---|
| 5,073,179 A | * | 12/1991 | Yoshimura et al. ............ 65/382 |
| 5,314,517 A | | 5/1994 | Koening et al. |
| 5,449,393 A | * | 9/1995 | Tsuneishi et al. ............. 65/377 |
| 6,178,778 B1 | * | 1/2001 | Kenmochi et al. ............ 65/381 |
| 6,454,562 B1 | * | 9/2002 | Joshi et al. ..................... 432/17 |

FOREIGN PATENT DOCUMENTS

| | | |
|---|---|---|
| EP | 0 870 736 A1 | 10/1998 |
| EP | 0 999 189 | 5/2000 |
| GB | 2 344 585 A | 6/2000 |

(Continued)

OTHER PUBLICATIONS

"PID controller" (Jul. 16, 2009) from http://en.wikipedia.org/wiki/PID_controller. pp. 1-12.*

(Continued)

*Primary Examiner*—John Hoffmann
(74) *Attorney, Agent, or Firm*—McDermott Will & Emery LLP

(57) ABSTRACT

To provide a elongating method for elongating an optical fiber parent material with high reliability by implementing a high precision control for the outer diameter in short time. This elongating method includes a process for switching a control method for at least one of the control items of measurement object, based on at least one of a difference between measured value and target value and a change rate of the difference per unit time, in measuring the outer diameter of a glass parent material elongating portion and making a feedback control for the elongating conditions based on the difference from the target outer diameter.

6 Claims, 3 Drawing Sheets

FOREIGN PATENT DOCUMENTS

| | | |
|---|---|---|
| JP | 61-136931 | 6/1986 |
| JP | 3-153538 | 7/1991 |
| JP | 10-167745 | 6/1998 |
| JP | 10-287441 | 10/1998 |
| JP | 11-100224 | 4/1999 |
| JP | 2000-169171 A | 6/2000 |
| JP | 2000-302469 | 10/2000 |

OTHER PUBLICATIONS

Japanese Office Action, with English Translation, issued in Japanese Patent Application No. JP 2004-515499, dated Dec. 24, 2008.

Japanese Office Action, with English translation, issued in Japanese Patent Application No. 2004-515499, mailed Oct. 14, 2009.

\* cited by examiner

OUTER DIAMETER MEASURING INSTRUMENT 13 → OUTER DIAMETER DEVIATION → REGULATOR 12 → CONTROL OBJECT 14 ← TARGET VALUE

METHOD FOR DRAWING GLASS PARENT MATERIAL AND DRAWING MACHINE FOR USE THEREIN

TECHNICAL FIELD

The present invention relates to a method and apparatus for elongating a glass parent material, and more particularly to the control of the outer diameter of a glass parent material.

RELATED ART

Conventionally, a method for elongating an optical fiber glass parent material into a desired outer diameter has been well known which typically involves successively heating and softening the glass parent material from one end thereof, employing heating means such as a resistance heating furnace, and applying a tensile stress on the glass parent material to match the measured value with the target value while measuring the reduced outer diameter of the glass parent material, whereby the moving speeds of upper holding means and lower holding means for holding an upper end and a lower end of the glass parent material are controlled.

Various outer diameter control methods have been offered.

For example, a control method for compensating a waste time is offered in which the size of a glass article is measured on-line, a change in the elongating speed and an influence of the change exerting on the measurement size are measured (JP-A No. Hei7-2539).

With this method, in the case of an elongated body having small outer diameter, the elongating speed can be relatively large in elongating the glass parent material into constant outer diameter, so that the control response is faster. However, if the elongated body as thick as about 30 mm is obtained, the elongating speed is slower, it takes more time to make the control response, and the system is not stable or delayed to be stable, resulting in a problem that the critical amount is increased.

Also, another method has been offered in which outer diameter measuring instruments are installed at two sites and the elongating speed is controlled based on the outer diameter values of a preform measured at two sites to improve an outer diameter precision of the elongated body (JP-A No. Hei10-167745).

This method has a problem that if two outer diameter measuring instruments are provided, the control parameters are more complicate. Also, the cycle of outer diameter variation may be often different at a elongating start end and near a central part, resulting in a problem that the linkage of outer diameter measuring instruments at two stage is difficult.

In this way, with the conventional method, it is extremely difficult to make the outer diameter control at high precision and efficiently.

This invention is achieved in the light of the above-mentioned problems, and it is an object of the invention to provide an optical fiber parent material with high reliability by implementing the outer diameter control easily and at high precision.

SUMMARY OF THE INVENTION

Thus, the present invention provides a elongating method including a process for measuring the outer diameter of a glass parent material elongating portion and controlling the elongating conditions by feedback based on a preset target value of the outer diameter, characterized by including a process for switching a control method for at least one of the control items of measurement object, based on at least one of a difference between the measured value and the target value of the outer diameter, and a change rate of the difference per unit time.

That is, with this method, the control method (way of control) is switched between a portion having a large variation in the outer diameter and a portion having a small variation in the outer diameter.

In the elongating process, the elongating conditions are greatly varied, depending on whether the difference between the measured value and the target value is large or small, whereby the required parameters for the proper control may be varied. Thus, two or more kinds of control parameters (coefficients of control items) are employed, and the control parameters are switched depending on the difference between the measured value and the target value, and a slope of the difference, viz., the charge rate per unit time, whereby the proper control over the total length of elongating is enabled.

By the way, to increase the precision of a finished diameter, it is required to locate the measuring position by an outer diameter measuring instrument at a part closer to the finished outer diameter. However, because the interval between the heating part and the outer diameter measuring part is larger, the outer diameter control at the position near the finished outer diameter is slower in the response time, whereby it is difficult to adjust the outer diameter constant under the outer diameter control. With the method of the invention, a suitable control method, such as a PID control in combination of not only the proportional control based on the amount proportional to the difference from the target outer diameter but also the control according to the integral amount and the differential amount, is selected and switched, whereby the control with excellent response is enabled.

For example, when the elongating is made employing the PID control, the difference from the target value is often large at the start end of elongating. There is a great variation at the start end of elongating, requiring to respond to the target value rapidly, whereby it is required to make the differential control by predicting a variation in the outer diameter, and performing the control in reverse direction.

On the contrary, if the target value is reached, the outer diameter in elongating is not greatly varied. Accordingly, the differential control is not always required, or conversely, if the differentiation is too intense, the variation in the measured value due to noise is also controlled, the variation is often caused to be amplified and not converged.

In this way, regarding the elongating control, the variation is great from the start time of elongating until the target value is reached, but once the target value is reached, the variation is smaller. The method of the invention is achieved in view of this respect.

Accordingly, the optimal control is enabled by switching the control method at the start time and after the target value is reached.

Desirably, the control operation expression for feedback control is changed to switch the control method.

That is, the invention provides a method for elongating a glass parent material for heating the glass parent material employing a heat source and controlling at least one of the control items of a relative input rate of the glass parent material into the heat source, a relative elongating rate of the glass parent material from the heat source, and a heating temperature of the heat source, characterized in that supposing that a difference between the target value and the measured value of outer diameter at a measuring position of outer diameter for a elongating portion of the glass parent material is A, an integral value of A over a predetermined time is B, and a change rate of A per unit time is C, the control items are controlled based on an expression including A, B and C in which at least one of the coefficients of A, B and C is not zero, so that at least one of the coefficients of A, B and C in the expression is changed from a first value to a second value different from the first value, when at least one of A and C passes over a predetermined value.

Also, the invention provides a method for elongating a glass parent material by measuring the outer diameter of a glass parent material elongating portion at a predetermined position, and controlling the control items based on the following expression, $$X=V_0+K_P(E(t)+1/T_I\int^t E(u)du+T_D dE(t)/dt)$$

characterized in that when at least one of the E(t) and dE(t)/dt passes over a predetermined value in the above expression, at least one of $K_P$, $T_I$ and $T_D$ is changed from a first value to a second value different from the first value, where E(t) is a difference between a measured value of the outer diameter at a measuring point and a target value, $\int^t E(u)du$ is integration of E(t) over a predetermined time, dE(t)/dt is a change rate of E(t) per unit time, X is at least one of the control items including a relative input rate of the glass parent material into a heat source for heating the glass parent material, a relative elongating rate of the glass parent material from the heat source, and a heating temperature of the heat source, $V_0$ is a constant, and $K_P$, $T_I$ and $T_D$ are coefficients at least one of which is not zero.

Also, desirably, the control parameters are switched at a switching point where the difference between the measured outer diameter and the target outer diameter is in a range from at least 0.1 to 1.0 mm.

In this way, if the difference in switching is within 1 mm, the variation in the outer diameter of glass parent material is suppressed more efficiently, whereby the glass parent material is obtained with the variation amount of outer diameter within ±0.2 mm.

Also, within 0.1, the variation is greater, whereby the control is difficult.

Further, beyond 1 mm, there is a drawback that the meaning of two-stage control is lessened.

Also, desirably, the control parameters are switched at a switching point where the change rate of the difference between measured outer diameter and target outer diameter per unit time is in a range from at least 0.3 to 3.0 mm/min.

In the case of elongating control, since the situation is greatly varied between the time when the difference between measured outer diameter and target outer diameter is large (a the start end of elongating) and the time when it is small (near the central part of the elongated body (optical fiber parent material)), the control parameters required for the proper control may be possibly varied.

From various results of experiment, the present inventors have found that the proper control can be made over the total length of the elongated body, employing the control parameters different depending on the difference between measured value and target value, or the change rate of the difference per unit time, so that the optical fiber parent material with high precision of the outer diameter is produced.

Since the period (time) of waveform in the variation of outer diameter in elongating is almost constant under the same elongating conditions, the slope (change rate of the difference per unit time) is increased with the larger difference from the target value. Also, if the change rate is greater with the same difference, it is required to make the reverse control rapidly. Accordingly, the slope (change rate) of the difference is as important a factor as the difference from the target value of outer diameter.

Thus, as the switching condition for the control parameters, the change rate of the difference per unit time is set up, in addition to the difference from the target value of outer diameter, whereby a change in the elongating state is detected with high response.

Desirably, employing the PID control for at least one of the control methods, the control is made in proportion to the difference from the target value, and in accordance with the differential amount (change rate per unit time) and the integral amount, whereby the control is performed fast and at high reliability.

Also, desirably, in this PID control method, when the difference from the target outer diameter or the change rate of the difference per unit time is large, the value of the control coefficient is a coefficient of the difference in a range from 10 to 2000/min, a coefficient of the integral value of the difference over the predetermined time in a range of 50 minutes or more, and a coefficient of the change rate of the difference per unit time in a range of 5 minutes or more.

With this constitution, when the difference from the target outer diameter is large, it is required that the control with differential term is relatively greater than with the integral term.

Also, desirably, the PID control method is characterized in that when the difference from the target outer diameter, or the change rate of the difference per unit time is smaller than a predetermined value, the value of the control item is a coefficient of the difference in a range from 10 to 2000/min, a coefficient of the integral value of the difference over the predetermined time in a range of 500 minutes or less, and a coefficient of the change rate of the difference per unit time in a range of 200 minutes or less.

With this constitution, when the difference from the target outer diameter is small, it is required to intensify the control with integral term.

Or this control method includes the control in proportion to the difference between measured value of outer diameter and target value, whereby the proportional constant is switched. In this way, in the case of the elongating not requiring too fast response, not the PID control but the proportional control method that is the simple parameter control method may be desirably employed.

Also, desirably, the above method is characterized in that the upper part holding means and the lower part holding means hold the upper and lower sides of the glass parent material to be elongated, in which at least one of a change rate of the speed of the upper part holding means and a change rate of the speed of the lower part holding means is changed, so that at least one of the relative input speed of the glass parent material and the relative elongating speed of the glass parent material is changed.

This control method is characterized in that the change rate of the speed of the upper part holding means and the change rate of the speed of the lower part holding means are altered.

With this method, since the direction for feeding back the operation amount is different between the upper part holding means and the lower part holding means, the different elongating conditions are created according to the change rate of the speed.

Also, this invention provides an apparatus for elongating a glass parent material, comprising upper part holding means and lower part holding means for holding the upper and lower ends of the glass parent material, a heat source for heating the glass parent material, an outer diameter measuring instrument for measuring the outer diameter of a elongating portion in the glass parent material, and control means for controlling the elongating conditions by controlling at least one of the control items including a relative input speed of the glass parent material into the heat source, a relative elongating speed of the glass parent material from the heat source, and a heating temperature of the heat source, based on a difference between a measured value of outer diameter obtained by the outer diameter measuring instrument and a target value of outer diameter of the elongating portion in the glass parent material, characterized in that in a control expression of the control items in which at least one of the difference, an integral value of the difference over a predetermined time and a change rate of the difference per unit time is not zero, when at least one of the difference and the change rate of the difference per unit time passes over a predetermined value, at least one of the coefficients in the expression is changed from a first value to a second value different from the first value.

In this elongating apparatus, the control method is switched between a portion with large outer diameter variation and a portion with small outer diameter variation. The two or more kinds of coefficients are employed and switched depending on the difference between measured value and target value or the change rate of the difference per unit time, whereby the proper control is made over the entire length of elongating.

BRIEF DESCRIPTION OF THE ELONGATINGS

In these figures, 1 denotes a glass parent material, 2 denotes a dummy rod, 3 denotes a dummy rod, 4 denotes an upper drive portion, 5 denotes a lower drive portion, and 6 denotes a heater.

BEST MODE FOR CARRYING OUT THE INVENTION

A preferred embodiment of a method for manufacturing an optical fiber parent material according to this invention will be described below with reference to the accompanying elongatings.

Figure 1:
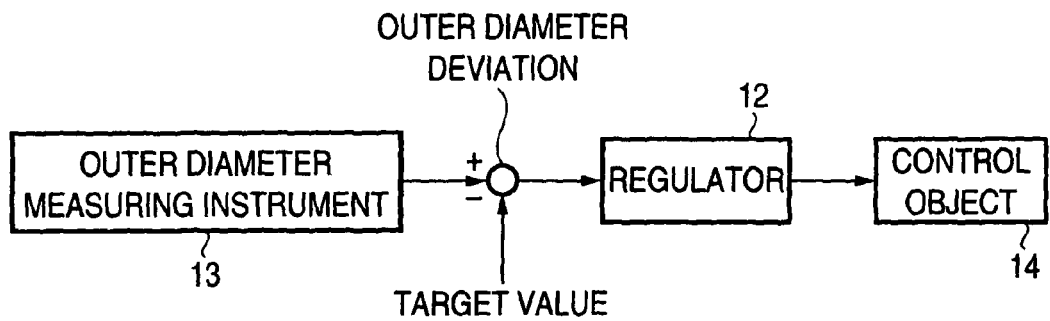
FIG. 1 is a block diagram showing a elongating control method according to an embodiment of the present invention.

In this embodiment, a control unit is constituted of a regulator 12 for outer diameter control with a PID method in which a control method is switched between a portion with large outer diameter variation and a portion with small outer diameter depending on a change rate of difference per unit time, and a control output value is fed back to a control object based on a difference between a target value 11 and a measured value of an outer diameter measuring instrument 13, as shown in FIG. 1.

A elongating apparatus as used herein comprises a glass parent material 1 having the dummy rods 2 and 3 at both ends, an upper drive portion 4 and a lower drive portion 5 for holding the glass parent material via the dummy rods 2 and 3, a heater 6 as a heat source for heating the glass parent material before elongating that is held by an upper drive portion chuck and a lower drive portion chuck attached respectively to the upper drive portion 4 and the lower drive portion 5, an outer diameter measuring instrument 7 for measuring the outer diameter of a elongating portion 1E of the glass parent material 1, and a control unit 8 for controlling the elongating conditions through the feedback based on the measured value of the outer diameter of the elongating portion 1E of the glass parent material 1 obtained by the outer diameter measuring instrument 7, and the target value of the outer diameter.

Herein, this control unit switches the coefficients based on at least one of the difference between the measured value of the outer diameter and the target value and the change rate of the difference per unit time.

The glass parent material 1 is placed inside a core pipe, and held via the dummy rods 2 and 3 exposed at both ends thereof by the upper drive portion chuck of the upper drive portion 4 and the lower drive portion chuck of the lower drive portion 5. Thereby, the glass parent material 1 is lowered so that the lowering speed of the lower drive portion 5 is greater than the lowering speed of the upper drive portion 4 and elongated. Further, an inert gas introducing portion for introducing the inert gas into this core pipe, as needed, is formed, whereby oxidation is prevented by supplying the inert gas.

And the elongating state is greatly varied depending on whether the difference between the measured value of the outer diameter after elongating and the target value is large or small, the control parameters are appropriately changed at a proper timing, so that a proper control is made over the entire length of elongating.

This elongating process is performed in the following way. First of all, the glass parent material having the dummy rods at the upper and lower ends is held by the upper and lower drive portion chucks, and installed within a elongating furnace. Then, the temperature of the heater is increased, and the glass parent material is sufficiently heated, and lowered by giving a speed difference between the upper and lower drive portions and elongated.

At this time, the outer diameter of the glass parent material after elongating is adjusted under the control of the control unit 8, based on a measurement output from the outer diameter measuring instrument 7 in a range where the lowering speed of the upper drive portion chuck is smaller than the lowering speed of the lower drive portion chuck.

Also, the lowering speed of the lower drive portion chuck at this time or the heating temperature may be adjusted by the control unit.

That is, the control method is switched depending on whether there is a large outer diameter difference from the target value at the elongating start end or there is a small outer diameter difference from the target value near the central part of the elongated body to make use of the appropriate control method at each time, whereby the proper control is made over the entire length of the elongated body.

EXAMPLES

Firstly, a glass parent material having an outer diameter of 80 mm is prepared.

And the glass parent material having the dummy rods at upper and lower ends is installed in a elongating apparatus as explained in the previous embodiment.

In this state, a heater 6 is turned on to increase the furnace inside temperature from ordinary temperature to 1700 to 2200° C.

If an intended temperature is reached this way, the glass parent material starts to be elongated at a elongating speed of 40 m/min. At this time, the outer diameter of the glass parent diameter while being elongated is measured and controlled by feeding back a difference from the preset outer diameter to the feed speed (upper drive portion chuck speed) of the input parent material.

Herein, the preset outer diameter is 30.5 mm, and the input speed Va is controlled after the difference (E(t)) between the preset outer diameter and the outer diameter measured value is placed under the PID control as represented by the following expression.

$$V_a = V_0 + K_P(E(t) + 1/T_I \int^t E(u)du + T_D dE(t)/dt)$$

Where the initial speed $V_0$ is set at 5.5 mm/min.

Also, the values of parameters $K_P$, $T_I$ and $T_D$ are changed depending on the difference between the outer diameter measured by the outer diameter measuring instrument and the target diameter. That is, when the outer diameter difference is less than 0.3 mm, $K_P$ is 1000/min, $T_I$ is 40 minutes and $T_D$ is 10 minutes. When it is equal to 0.3 mm, the values of parameters $K_P$, $T_I$ and $T_D$ are changed. When it is more than 0.3 mm, $K_P$ is 1000/min, $T_I$ is 1000 minutes and $T_D$ is 100 minutes.

Figure 3:
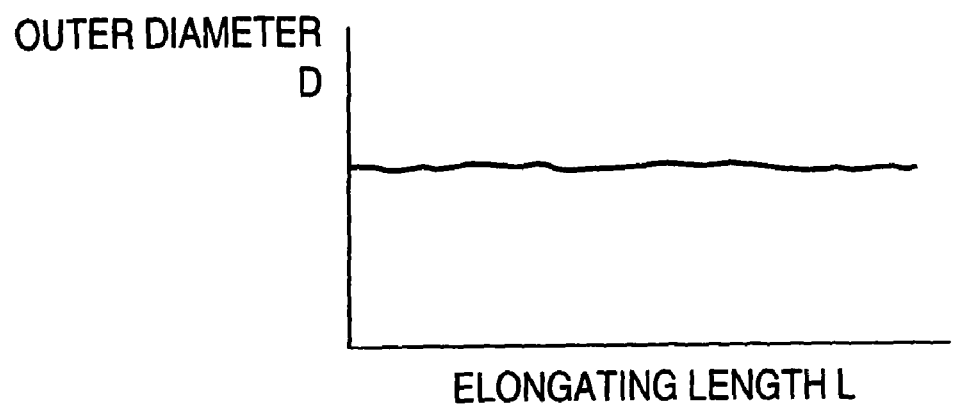
FIG. 3 is a graphical representation showing variations in the outer diameter of the glass parent material that is elongated by the method of example 1.

The results of this control are shown in FIG. 3.

Consequently, the outer diameter as shown in FIG. 3 is as excellent as 30±0.2 mm. Herein, the longitudinal axis represents the outer diameter D and the transverse axis represents the elongating length L.

Comparative Example 1

Figure 2:
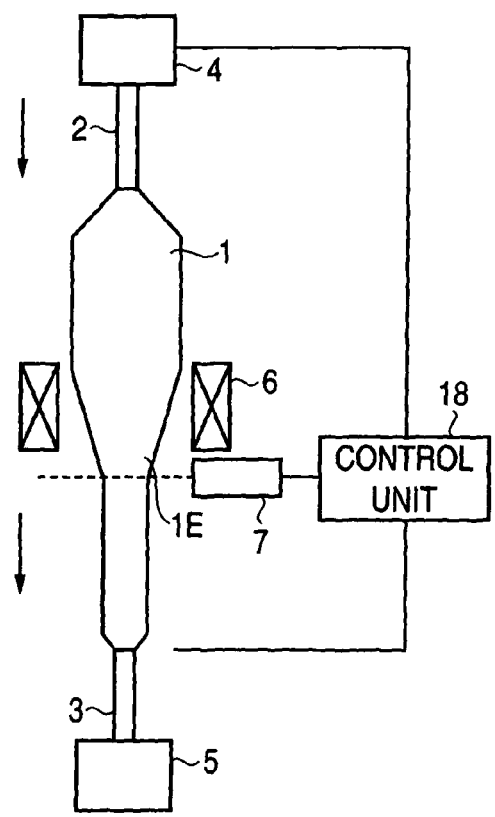
FIG. 2 is a view showing a elongating apparatus according to the embodiment of the invention.

In this comparative example, like the example 1, a elongating apparatus and a control unit as shown in FIGS. 1 and 2 are employed for the control, but the coefficients are not changed, in which $K_P$ is 1000/min, $T_I$ is 40 minutes and $T_D$ is 10 minutes over the entire elongating process.

Figure 4:
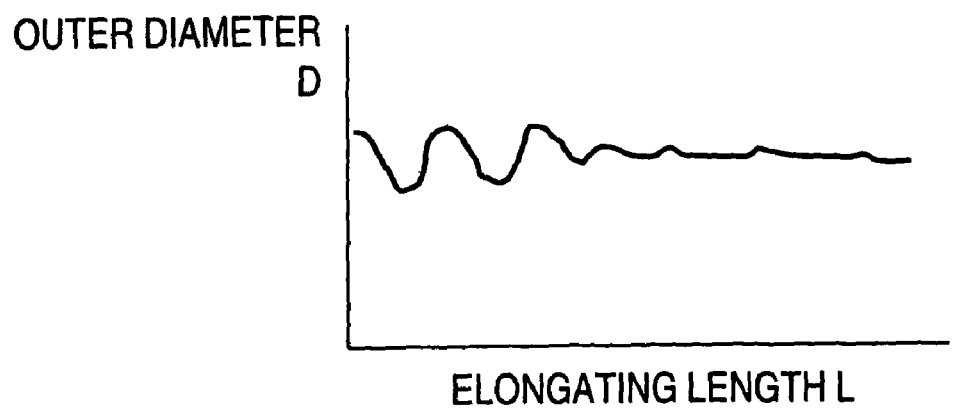
FIG. 4 is a graphical representation showing variations in the outer diameter of the glass parent material that is elongated by the method of comparative example 1.

The results of this control are shown in FIG. 4.

Consequently, the outer diameter had as large variations as 30±0.5 mm as shown in FIG. 4.

Comparative Example 2

In this comparative example, like the example 1, a elongating apparatus and a control unit as shown in FIGS. 1 and 2 are employed for the control, but the coefficients are not changed, in which $K_P$ is 1000/min, $T_I$ is 1000 minutes and $T_D$ is 100 minutes over the entire elongating process.

Figure 5:
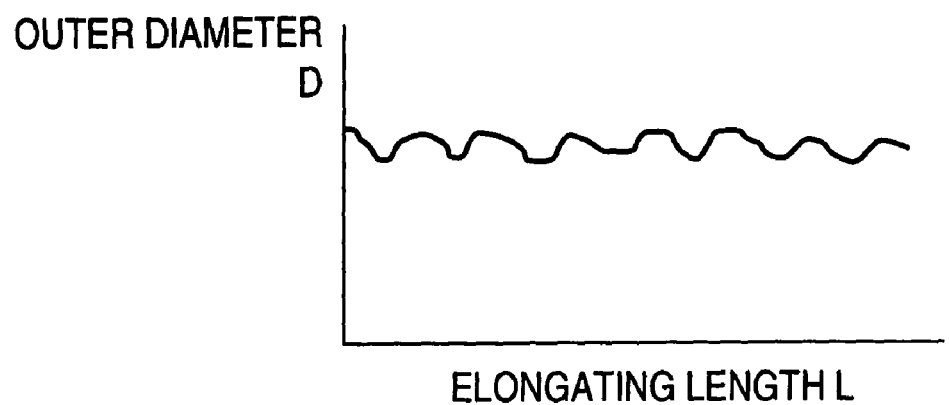
FIG. 5 is a graphical representation showing variations in the outer diameter of the glass parent material that is elongated by the method of comparative example 2.

The results of this control are shown in FIG. 5.

Consequently, the outer diameter had as large variations as 30±0.4 mm as shown in FIG. 5.

Comparative Example 3

In this comparative example, like the example 1, a elongating apparatus and a control unit as shown in FIGS. 1 and 2 are employed for the control, but the elongating is performed by the control method represented by the following expression.

$$V_a = V_0 + K(E(t))$$

Herein, the coefficients are not changed, in which $K_P$ is 50/min and $V_0$ is 50/min over the entire elongating process.

Figure 6:
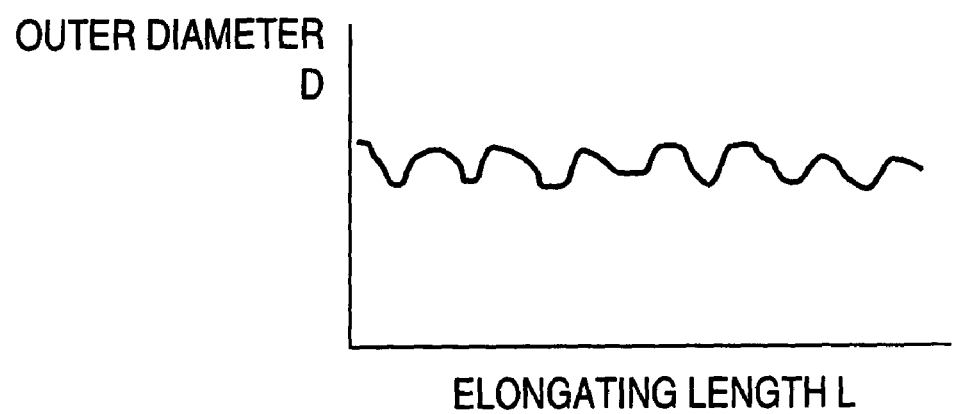
FIG. 6 is a graphical representation showing variations in the outer diameter of the glass parent material that is elongated by the method of comparative example 3.

The results of this control are shown in FIG. 6.

Consequently, the outer diameter had large variations as shown in FIG. 6.

From the comparison between the example 1 and the comparative examples 1 to 3, it will be found that at least one of the coefficients regarding the control items is changed depending on the difference between the measured value and the target value, whereby the outer diameter control at high precision can be made.

In the previous example, at least one of the coefficients is changed at the time the difference between the measured outer diameter and the target outer diameter is 0.3 mm, but may be changed when the difference falls in a range from 0.1 to 1.0 mm, whereby the outer diameter control at high precision is enabled.

Also, it is possible to predict the change earlier based on a change rate of the difference per unit time, but not the difference between the measured value of the outer diameter and the target value, whereby the control method may be changed based on the magnitude of the change rate of the difference per unit time. With this control, the high response is attained.

Though in the previous example, the control method involves changing the parameters employing the PID, the control may be made, employing the PID for at least one of the parameters, in proportion to the difference between the measured value of the outer diameter and the target value, and in accordance with its differential value and integral value, whereby the control can be made fast and at high reliability.

The parameters with the PID control method include the proportional constant, the differentiation time and the integration time, and those set values are provided at two stages, whereby the parameters may be automatically changed by selecting any one of them depending on the difference from the target value, or the change rate of the difference per unit time in actually making the elongating.

Further, this invention is not limited to the PID control, but may be applied to the simpler proportional control. In this case, the proportional constant, but not the PID value, may be set at two stages, and changed. This change may not be made before or after a certain point of time, for example, after the target value or its neighborhood is reached, whereby the elongating is conducted under fixed conditions.

Desirably, this control method includes a control in proportion to the difference between the measured value of the outer diameter and the target value, whereby the proportional constant is changed. In this way, in the case of elongating not requiring very fast response, the proportional control method that is the simpler control method of parameters, but not the PID control, may be employed. Also, after the difference between the measured value of the outer diameter and the target value, or the change rate of the difference per unit time is smaller than a certain value, the coefficients are zero, or no control is made.

Also, desirably, not only the control method but also the control object may be changed, in which the rate of the change amount of the upper drive portion chuck speed and the rate of the change amount of the lower drive portion chuck speed are changed.

This invention is described above in connection with the specific embodiments, but it will be apparent to those skilled in the art that various changes or modifications may be made without departing from the spirit or scope of the invention.

This application is based on Japanese Patent Application (JP 2002-178372) as filed Jun. 19, 2002, its contents being incorporated herein by reference.

INDUSTRIAL APPLICABILITY

As described above, since the situation is greatly varied between the start end of elongating and the central part of the glass parent material after elongating in the elongating control, the different control parameters are switched depending on the time of control to provide the control parameters required for the proper control, whereby the proper control is made over the entire length of the glass parent material.

Also, the switching conditions of the control parameters include the difference between measured value and target value of outer diameter and the change rate of the difference per unit time, where the change in the elongating conditions can be detected at higher response to allow for the fast control with high reliability.

The elongating apparatus of the invention comprises switching means for switching the control method for at least one of the control items of measurement object, based on at least one of the difference between measured value and target value and the change rate of the difference per unit time, whereby the control method is switched between the portion with large outer diameter variation and the portion with small outer diameter variation, so that the proper control is made over the entire length of elongating.

The invention claimed is:

1. A method for elongating a glass parent material, from an original diameter of the glass parent material to a target diameter by input of the glass parent material into a heat source, the method including steps of:
   measuring an outer diameter of a glass parent material elongating portion;
   calculating at least one item selected from: a relative input rate of the glass parent material into the heat source, a relative elongating rate of the glass parent material from the heat source, and a heating temperature of the heat source, using an expression of A and at least one of B and C including a coefficient of A, and at least one of coefficients of B and C, where A is a difference between the target diameter and the measured diameter, B is an integral value of A over a predetermined time, and C is a change rate of A per unit time;
   switching at least one of the coefficients of A, B, and C in the expression from a first value to a second value different from the first value, when at least one of A and C passes over corresponding one of a threshold value of A and a threshold value of C so that the measured outer diameter becomes the target diameter; and
   heating and elongating the glass parent material such that at least A or C crosses the threshold value.

2. The method of claim 1, wherein the threshold value of A is in a range from 0.1 to 1.0 mm.

3. The method of claim 1, wherein the threshold value of C is in a range from 0.3 to 3.0 mm/min.

4. The method of claim 1, wherein in the calculating step, at least the relative input rate of the glass parent material into the heat source is calculated.

5. A method for elongating a glass parent material, from an original diameter of the glass parent material to a target diameter by input of the glass parent material into a heat source, the method including steps of:
   measuring an outer diameter of a glass parent material elongating portion;
   calculating at least one item selected from: a relative input rate of the glass parent material into the heat source, a relative elongating rate of the glass parent material from the heat source, and a heating temperature of the heat source, by using the following formula:

$X = V_0 + K_p(E(t) + 1/T_I \int E(u)du + T_D dE(t)/dt)$;

switching at least one of $K_p$, $T_I$ and $T_D$ from a first value to a second value different from the first value, when at least one of $E(t)$ and $dE(t)/dt$ passes over corresponding one of a threshold value of $E(t)$ and a threshold value of $dE(t)/dt$, so that the measured outer diameter becomes the target diameter; and
   heating and elongating the glass parent material such that at least of $E(t)$ and $dE(t)/dt$ crosses the threshold value of $E(t)$ and the threshold value of $dE(t)/dt$, respectively,
   wherein $E(t)$ is a difference between a measured value of the outer diameter at a measuring point and a target value and the threshold value of $E(t)$ is in a range from 0.1 to 1.0 mm;
   $\int E(u)du$ is integration of $E(t)$ over a predetermined time;
   $dE(t)/dt$ is a change rate of $E(t)$ per unit time and the threshold value of $dE(t)/dt$ is in a range from 0.3 to 3.0 mm/min;
   X is one of said at least one item;
   $V_0$ is a constant; and
   $K_p$, $T_I$ and $T_D$ are coefficients.

6. The method of claim 5, wherein in the calculating step, at least the relative input rate of the glass parent material into the heat source is calculated.

* * * * *